June 19, 1956
S. G. SHAND
2,751,185
SEAT ROTARY SPHERICAL PLUG VALVE
Filed Jan. 28, 1949
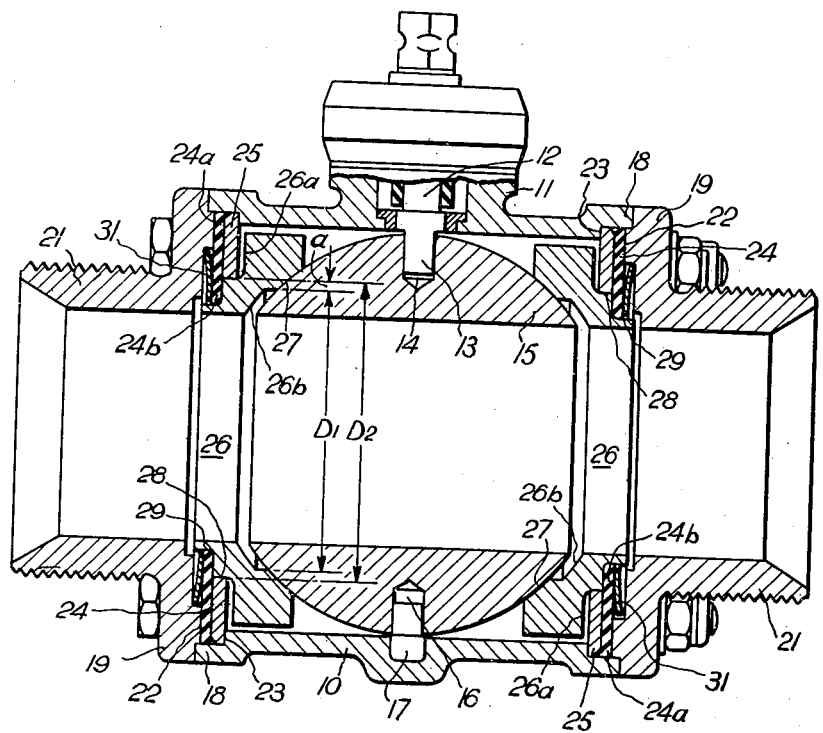
INVENTOR
Stanley Grapes Shand
BY
ATTORNEY ated within the diameter $D_2$. The fluid in the pipe, in

United States Patent Office 2,751,185
Patented June 19, 1956

2,751,185
SEAT FOR ROTARY SPHERICAL PLUG VALVE

Stanley Grapes Shand, Cwmbran, Newport, England, assignor to Saunders Valve Company Limited, Cwmbran, Newport, England, a British company Application January 28, 1949, Serial No. 73,238

Claims priority, application Great Britain February 13, 1948

15 Claims. (Cl. 251—172)

This invention relates to rotary plug cocks of the type in which at least on one side the plug is engaged by a seating ring surrounding the passageway in the valve body, which ring is separate from the valve body and is able to rock a little about the axis of the passageway, the ring being supported against the plug by an annular flexible diaphragm, also surrounding the passageway, the diaphragm being clamped at its periphery within the valve body, and exposed on its outer surface i. e. its surface remote from the plug, to the fluid pressure. Plug cocks of this type in which the plug rotates between two such seating rings are described and claimed in United States patent application No. 546,240, which matured to Patent No. 2,520,288 on August 29, 1950.

In cocks of this type it has been found, especially in larger sizes, for instance in cocks of 1¼ inch bore and upwards used in aircraft fuel lines, that the fluid pressure acting through the flexible diaphragm on its seating ring causes the friction against, and therefore the torque necessary to turn, the plug to be higher than is desirable, even when the area of the diaphragm is reduced as much as practical constructional requirements will allow.

According to the present invention in a plug cock of the type referred to, the pressure of the, or at least one, seating ring against the plug due to fluid pressure is reduced by carrying the surface of the valve body in which the diaphragm is clamped, inward on the plug side of the diaphragm to a position lying within the external diameter of the seating ring, thereby reducing the area of the diaphragm which is exposed to the fluid pressure and is thereby caused to press the seating ring against the plug.

By way of example a preferred form of the invention will now be described with reference to the accompanying drawing which shows the valve in longitudinal section.

Referring to the drawing, the valve body 10 comprises a hollow casting, in the main of square cross section, without integral end walls, and from one side of it projects a hollow cylindrical extension 11. An operating spindle 12 is supported in the extension 11 and with its inner, non-circular end 13 engages in a corresponding recess 14 in the plug 15. Diametrically opposite to this recess 14, the plug is formed with a second, circular-sectioned recess 16 and engaged by a pin 17 fixed in the valve body 10.

The ends of the valve body 10 are formed with sockets 18 and are closed by bolted-on spigotted flanges 19 of pipe connections 21, the cylindrical portions of which are screw-threaded or otherwise adapted for attachment to pipes conveying fluid or to apparatus to be supplied with fluid. The bores of the connections 21 constitute a passageway in the valve body with which the duct in the plug 15 is aligned when the plug is rotated into the position shown, while when it is rotated through a right angle, the plug closes the passageway, all as will be well understood by those skilled in the art. The inner faces 22 of the spigotted flanges 19 do not come up against the shoulders 23 of the sockets 18 and in the spaces so formed are clamped the peripheral margins of the annular diaphragms 24 made of rubber or like flexible material and rigid annular metal washers 25 which constitute inward extensions of the surface of the valve body, the diaphragms and washers surrounding the passageway in the body. Fluid tight joints between the valve body and the plug 15 are established by seating rings 26 also surrounding the passageway. On their plug sides these seating rings are formed with annular spherical seats 27. The internal diameter $D_1$ of these seats 27 is increased by counterboring the seating rings on the plug side as at 26b. The outside or side remote from the plug of each seating ring is formed with two annular steps 28, 29. The outer step 28 is of diameter $D_2$ and comes into loose sliding contact with the inner edge of the washer 25. The looseness of fit will be made such as to allow the desired freedom to rock of the seating ring. The surface 26a of the seating ring lying to the outside of this step 28 is spaced at a substantial clearance from the washer 25 to allow the ring the necessary freedom.

The outer portion 24a of the diaphragm on its plug side bears against the washer 25 whilst the inner portion 24b abuts against the surface of the seating ring between the steps 28 and 29. In the spaces between the diaphragm and the flange 19 is lodged a dished annular disc spring 31 surrounding the passageway which exerts a certain pressure on the inner portion 24b of the diaphragm.

It will be seen that though the pressure in the pipe has access to the back of the diaphragm up to the spigot on flange 19, the washer 25 constituting an inward extension of the valve body and forming an abutment for the outer portion of the diaphragm, reduces the effective pressure-exerting area of the diaphragm to that situated within the diameter $D_2$. The fluid in the pipe, in every position of the plug, also has access to the counterbored portions 26b of the seating rings so counterbalancing the fluid pressure on the portion of the diaphragm lying within the diameter $D_1$. The effective fluid pressure on the seating ring is therefore confined to the annular area $a$ lying between the circles of diameters $D_1$ and $D_2$. By varying the diameters $D_1$ and $D_2$ the effective fluid pressure on the seating ring can be varied. When the diameters are equal the annular area $a$ disappears and the effective fluid pressure becomes zero. The seating ring is then pressed against the plug by the disc spring 31 alone.

I claim:

1. A rotary plug cock of the type comprising a body having a passageway therein, a ducted plug rotatable in the body to bring its duct into and out of alignment with the passageway, at least one seating ring surrounding the passageway and engaging the side of the plug, said ring being separated from the body and slightly rockable about the axis of the passageway, and a flexible diaphragm surrounding the passageway, said diaphragm having part of its face remote from the plug exposed to fluid pressure in the passageway, means urging the inner marginal part of said diaphragm against said ring thereby urging said ring against the plug, means clamping the outer margin of the diaphragm within the body including a rigid means within the cock body in contact with the diaphragm on the plug side thereof, extending inward from the body towards the passageway to a position lying within the external diameter of the seating ring, thereby forming an abutment for the outer marginal part of the diaphragm and reducing the area of the diaphragm which is exposed to the fluid pressure and caused by that pressure to press the seating ring against the plug.

2. A rotary plug cock comprising a body having a passageway therein, a ducted plug rotatable in the body to bring its duct into and out of alignment with the passageway, at least one annular flexible diaphragm surrounding said passageway, means clamping the outer margin of said diaphragm in said body, the unclamped part of the diaphragm face remote from the plug being exposed to the fluid pressure in the body, a seating ring surrounding the passageway located on the plug side of and in contact with the inner portion of said diaphragm and engaging said plug with an annular area of its surface on the plug side, there being sufficient clearance in the body round the ring to allow it to rock slightly about the axis of the passageway, said clamping means including an annular washer surrounding the passageway having its internal diameter less than the external diameter of said seating ring, said washer being carried in the body against the plug side face of that portion of the diaphragm extending inward from the clamped margin, thereby reducing the area of the diaphragm through which the fluid pressure acting on the diaphragm is effective to press said seating ring against the plug to that which acts within the internal diameter of the washer.

3. A rotary plug cock as set forth in claim 1 wherein the urging means includes a spring surrounding the passageway and urging the diaphragm towards the plug.

4. A rotary plug cock as set forth in claim 2 also comprising a spring surrounding the passageway and urging the diaphragm towards the plug.

5. A rotary plug cock as set forth in claim 1 in which the seating ring is counterbored so as to expose its plug side to the fluid pressure and counterbalance part of the pressure exerted by the diaphragm.

6. A rotary plug cock as set forth in claim 5 wherein the urging means includes a spring surrounding the passageway and urging the diaphragm towards the plug.

7. A rotary plug cock as set forth in claim 6 in which the counterbore in the seating ring is of such diameter as to reduce the effective fluid pressure on the ring to zero.

8. A rotary plug cock as set forth in claim 2 in which the seating ring is counterbored so as to expose its plug side to the fluid pressure and counterbalance part of the pressure exerted by the diaphragm.

9. A rotary plug cock as set forth in claim 8 also comprising a spring surrounding the passageway and urging the diaphragm towards the plug.

10. A rotary plug cock as set forth in claim 9 in which the counterbore in the seating ring is of such diameter as to reduce the effective fluid pressure on the ring to zero.

11. A rotary plug cock of the type comprising a body having a passageway therein, a ducted plug rotatable in the body to bring its duct into and out of alignment with the passageway, at least one seating ring surrounding the passageway and engaging the side of the plug, said ring being separate from the body and slightly rockable axially of the passageway, a flexible diaphragm surrounding the passageway between the ring and the body and having part of its face remote from the plug exposed to fluid pressure in the passageway, rigid means supporting the outer margin of the diaphragm on the plug side thereof to a radial distance inwardly of the outer diameter of the seating ring within the body, thereby decreasing the area of the diaphragm which is exposed to fluid pressure, and resilient means urging the inner marginal portion of said diaphragm against said ring, thereby urging said ring against the plug, the effective radial dimension of the diaphragm which presses against the seating ring being substantially less than the radial dimension of the seating ring.

12. In a valve, a casing having a valve chamber and a port, a valve member movably mounted in said chamber, a sealing assembly mounted in said port and having a fluid passage therethrough in communication with the valve chamber, said sealing assembly comprising a carrier having a sealing face at one end thereof for engaging said valve member, an annular diaphragm clamped at its inner margin to the carrier, said diaphragm extending across a portion of the carrier and having its outer margin attached to the wall of said port, a rigid member mounted in said port and extending between a part of said unclamped diaphragm portion and a part of the carrier and serving to support said part of the unclamped diaphragm portion against flexure toward the valve member.

13. In a valve, a casing having a valve chamber and a port, a valve member movably mounted in said chamber, a sealing assembly mounted in said port and having a fluid passage therethrough in communication with the valve chamber, said sealing assembly comprising a carrier having a sealing face at one end thereof for engaging said valve member, an annular diaphragm clamped at its inner margin to the opposite end of said carrier, the outer surface of said carrier being stepped, said diaphragm extending across said step, and having its outer margin attached to the wall of said port, a rigid member mounted in said port and extending between said diaphragm and said step and serving to support a portion of the diaphragm against flexure toward the valve member.

14. In a valve, a casing having a valve chamber and a port, a valve member movably mounted in said chamber, a sealing assembly mounted in said port and having a fluid passage therethrough in communication with the valve chamber, said sealing assembly comprising a carrier having a sealing face at one end thereof for engaging said valve member, an annular diaphragm clamped at its inner margin to the carrier, said diaphragm extending across a portion of the carrier and having its outer margin attached to the wall of said port, a rigid member mounted in said port and extending between substantially the entire unclamped diaphragm portion and a part of the carrier and serving to support the unclamped diaphragm portion against flexure toward the valve member, and a spring urging the carrier into sealing contact with the valve member and constituting the clamp for the inner margin of the diaphragm.

15. A rotary plug cock comprising a body having a valve chamber and a port; a ducted plug rotatable in the valve chamber to bring its duct into and out of alignment with the port; a sealing assembly mounted in said body and having a fluid passage therethrough in communication with said valve chamber and port; said sealing assembly including a seating ring having a sealing surface in engagement with the plug, and an annular flexible diaphragm clamped at its inner margin to the seating ring and extending across a portion thereof and having part of its face remote from the plug exposed to fluid pressure in the port acting to press the seating ring against the plug; means clamping the outer margin of the diaphragm in said body; said clamping means including a rigid annular member mounted in said body having an internal diameter less than the external diameter of said seating ring; said rigid member engaging the diaphragm and extending inward from the clamped outer margin and preventing flexing of said diaphragm throughout the area of engagement, thereby restricting the effective area of said diaphragm exposed to fluid pressure in the port and responsive to said pressure to press said seating ring against the plug to the area of the diaphragm located within said internal diameter of the rigid member.

References Cited in the file of this patent

UNITED STATES PATENTS

| | | |
|---|---|---|
| 2,173,949 | Neveu | Sept. 26, 1939 |
| 2,191,232 | Heinen | Feb. 20, 1940 |
| 2,417,400 | Snyder | Mar. 11, 1947 |
| 2,520,288 | Shand et al. | Aug. 29, 1950 |

FOREIGN PATENTS

| | | |
|---|---|---|
| 102,242 | Sweden | of 1941 |